April 16, 1940. R. H. FLEET ET. AL 2,197,299
APPARATUS FOR ARRESTING LAUNCHING DEVICES FOR AIRPLANES
Filed Nov. 25, 1936 2 Sheets-Sheet 1
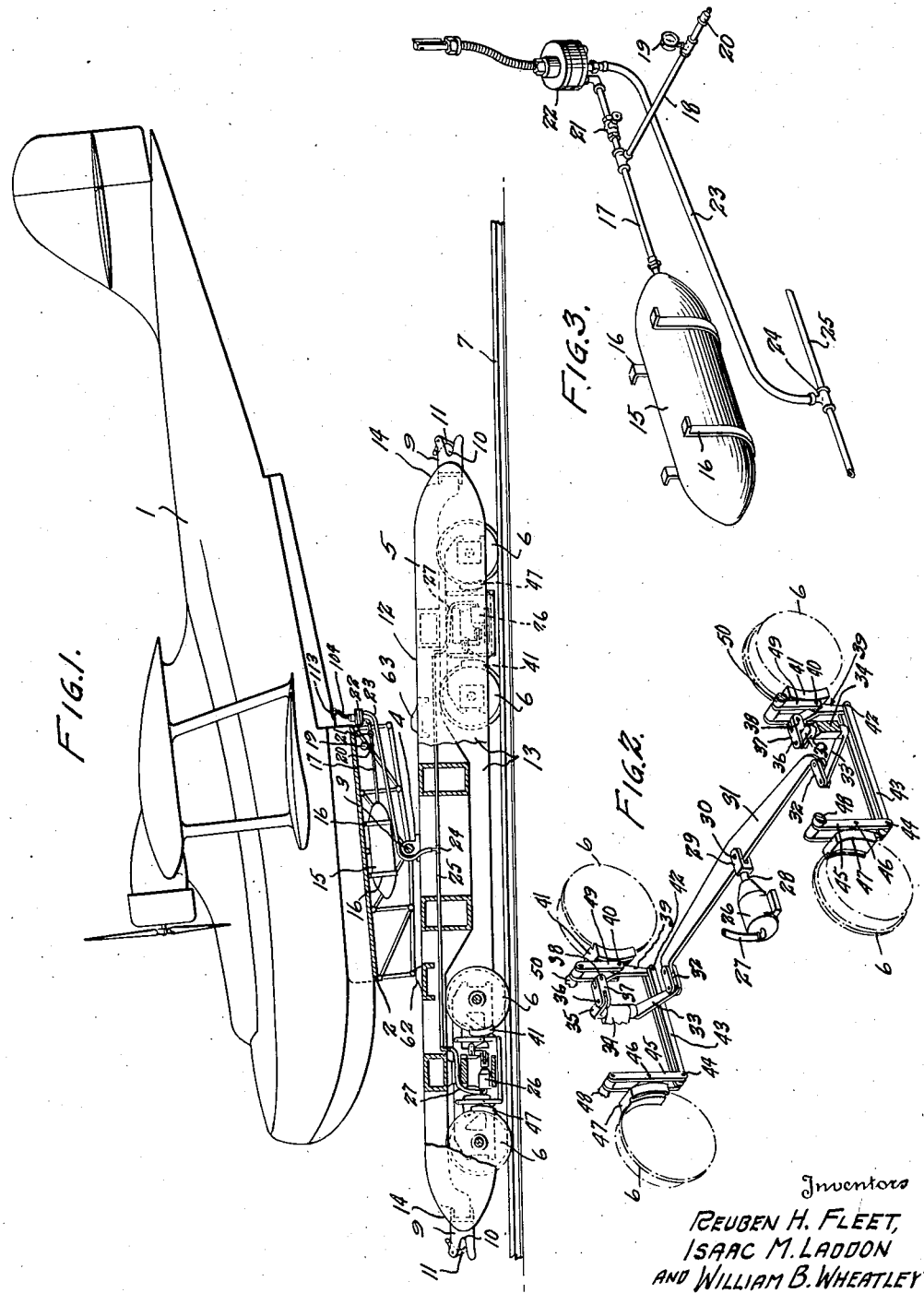

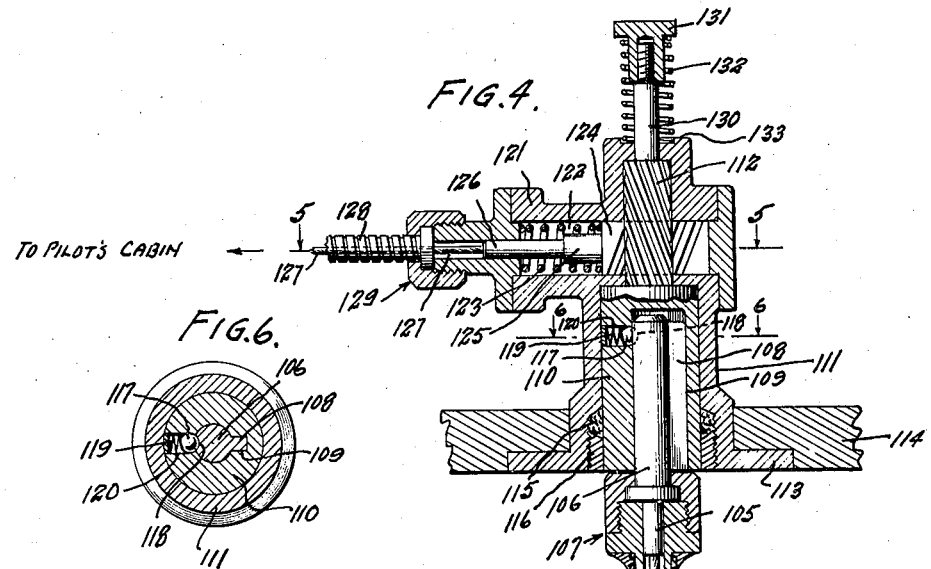
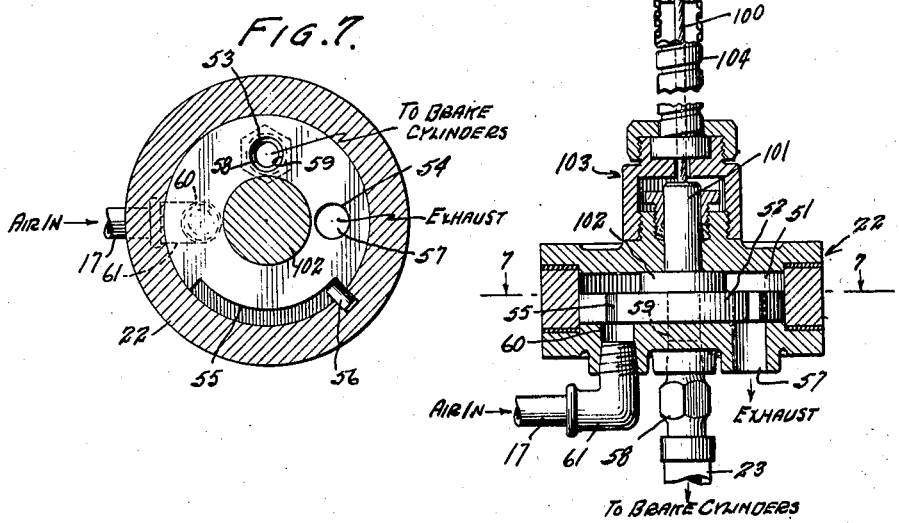
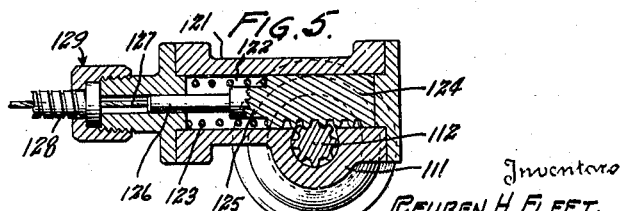

Patented Apr. 16, 1940

2,197,299

UNITED STATES PATENT OFFICE 2,197,299

APPARATUS FOR ARRESTING LAUNCHING DEVICES FOR AIRPLANES

Reuben H. Fleet, William B. Wheatley, and Isaac M. Laddon, San Diego, Calif.

Application November 25, 1936, Serial No. 112,803

2 Claims. (Cl. 244—63)

Our invention relates to launching means for airplanes either of the sea or land type.

This application is an improvement upon our co-pending application Serial No. 105,610, filed October 14, 1936.

In the application above referred to the construction and operation of the system is set forth at length, together with the advantages of this type of system. It is though unnecessary here to repeat in detail the discussion in that application. This application is directed to a construction for increasing the safety factors in launching an airplane from a moving vehicle.

Not only are the brakes automatically applied when the airplane leaves the vehicle, but a supplemental braking is effected by means of arresting gear cables.

Further, the braking of the vehicle is under the control of the pilot in the plane. This control of the braking feature is of great importance since if anything goes wrong, or if flying speed is not attained in a permissible length of run the pilot can remain on the vehicle and apply the brakes himself to the vehicle.

Airplane as used herein broadly includes land airplanes, seaplanes, flying boats, airboats, amphibians and any other heavier-than-air-aircraft. Body element and body unit as used herein broadly includes a land airplane fuselage, a flying boat airboat or amphibian hull, and the equivalent of a body in the case of a flying wing airplane having no external body.

It is an object of our invention to provide positive means for braking a vehicle supporting an airplane for launching which is powerful in effect, sturdy in construction and easy to repair and replace.

Another object of our invention is to provide a construction which will permit the pilot to apply the brakes on the vehicle on which the airplane rests for launching.

A further object of the invention is to provide such a construction which is positive in operation and simple in construction.

With these and other objects in view, which may be incident to our improvements, the invention consists in the parts and combinations to be hereinafter set forth and claimed, with the understanding that the several necessary elements comprising our invention may be varied in construction, proportions and arrangement, without departing from the spirit and scope of the appended claims.

In order to make our invention more clearly understood, we have shown in the accompanying drawings means for carrying the same into practical effect without limiting the improvements in their useful applications to the particular constructions, which for the purpose of explanation, have been made the subject of illustration.

In the drawings:

Figure 1 is a view in side elevation with parts broken away, showing a seaplane mounted on our launching vehicle on rails, the general disposition of the braking system and the controls being shown;

Fig. 2 is a detail view in perspective showing the construction of our braking linkages;

Fig. 3 is a perspective view in detail of the compressed air storage tank, piping connections and valve;

Fig. 4 is an exploded view partly in section taken through our valve and valve control mechanisms;

Fig. 5 is a view taken along the line 5—5 of Figure 4, looking in the direction of the arrows;

Fig. 6 is a view taken along the line 6—6 of Figure 4, looking in the direction of the arrows;

Fig. 7 is a view taken along the line 7—7 of Figure 4, looking in the direction of the arrows.

Referring to the drawings we have shown a seaplane 1 which is mounted on a cradle 2 that is pivoted at 3 on supports 4 carried on top of a car 5. The car 5 is mounted on wheels 6 which rest on rails 7. At the end of the track 7 is diagrammatically illustrated at 8 an arresting gear cable. The details of the arresting gear cable and the mechanism for keeping the cable taut are not shown as these are well known. The arresting gear cable is adapted to be caught in arresting gear catch elements 9 mounted at either end of the car 5. These elements 9 are provided with throats 10 in which the cable is adapted to be engaged, and pivoted latch members 11 which are raised when the cable enters the throat 10, and fall in place behind the cable after the cable is at the bottom of the throat 10. These arresting gear cables which are at the ends of each track of the system provide a safety measure in case the brakes have not fully brought the car to rest. The braking system will be described later. The car 5 is provided with a top 12 and sheathing 13 which comes partially over the wheels 6 and cuts down the wind resistance. The car at each end, as indicated at 14, is streamlined to reduce air resistance.

The brakes for the front and rear trucks of the car are of the pneumatic type. The system at either end of the car is the same. Compressed air is stored in a tank 15 mounted on the cradle 2 and held to the upper part of the cradle 2 by means of brackets 16. Attached to the compressed air tank is a compressed air line 17 having a branch line 18 with a pressure gauge 19 mounted therein. At the end of the branch line 18 is a one-way valve 20 which is adapted to be connected with some suitable source of compressed air near the air port. There is a cut-off valve 21 provided in the line 17. The tank 15 is filled through the valve 20 to the proper pressure, as indicated by the pressure gauge 19.

The line 17 leads to a valve construction 22 from which there is an air outlet line 23 of flexible construction, such as rubber, which is connected by means of a T-fitting 24 to a pressure line 25 which runs to the trucks at either end of the car 5.

At either end of the car 5 are located braking cylinders 26 which are connected by flexible hose 27 to the line 25. The braking cylinder construction is not shown in detail, and comprises a cylinder with a piston (not shown) connected to a piston rod 28 which carries a bifurcated end element 29 which is pivoted at 30 to an equalizing bar 31 of the braking system. It is to be understood that the system is the same for each end of the car.

The equalizing bar 31 is pivoted to links 32 which are pivoted to arms 33 that are mounted for rotation in supports 34 suitably supported by the framework of the truck which carries the wheels 6. Connected to the arms 33 are arms 35 which are pivoted at 36 to links 37.

The links 37 are pivoted at 38 to one end of bell crank levers 39. The center of the bell crank levers is pivoted at 40 to the top of brake shoes 41. The other arm of the bell crank levers is pivoted at 42 to links 43 which are pivoted at 44 to links 45. The links 45 are pivoted at 46 to the top of the other brake shoes 47 of the system. The tops of the links 45 are pivoted to support bars 48 carried by the trucks. Also links 49 are provided for supporting the brake shoes 41, the links being suspended from support pivots 50.

Upon admission of air through the flexible line 27 the equalizing bars 31 are pushed by the piston (not shown) in the cylinders 26 in a direction to rotate the arms 33 to cause the arms 35 to press against the upper arms of the bell crank levers 39, thus swinging the brake shoes 41 into contact with the surface of the wheels 6. Through the lower arms of the bell crank levers 39 and through linkage 43, brake shoes 47 are also applied to press against their respective wheels 6. In this manner braking is effected both on the front and the rear trucks of the car 5.

Upon release of pressure in the line 25 the brakes are released. In this type of construction there is usually a spring in the cylinder 26 which returns the parts to their starting position. Return springs can be used at other locations than in the cylinder 26.

We will now describe the valve mechanism and the valve control.

Referring to Figure 3, and particularly to Figures 4 to 7 inclusive, we have shown the valve casing 22 as comprising a central cylindrical aperture 51 in which is adapted to rotate a valve disk 52 provided with holes 53 and 54. A portion of the valve disk 52 is cut away, as indicated at 55, and a limiting stop 56 mounted on the inner wall of the aperture 51 is adapted to fit into the slot 55 to limit the rotative movement of the valve in either direction.

With the parts of the valve in the position shown in Figure 7, the hole 54 communicates with an exhaust exit 57 formed in the valve casing. The line 23 to the brake cylinders communicates with a fitting 58 which in turn communicates with an aperture 59 which lies directly below the aperture 53 formed in the rotative disk 52. In this position of the parts air under pressure flows back from the brake cylinders 26 through the valve, into the aperture 51 of the valve and out through hole 54 in the disk 52 and through exhaust 57.

When the valve is rotated so that the stop 56 lies against the other extremity of the slot 55, the hole 54 lies directly over aperture 59 leading to the line 23 to the brake cylinders, and hole 53 lies directly above an inlet aperture 60 formed in the valve casing 21, to which is connected through a coupling 61 the air inlet pipe 17. From the air inlet pipe 17 compressed air flows through aperture 60, through aperture 53 in the valve disk 52, and through aperture 54 in the valve disk 52 into an aperture 59, and compressed air is thus introduced through the line 23 into line 25 which sends compressed air to each of the brake cylinders 26.

Our mechanism is so constructed that the rotation of the valve just described can be effected either under control of the pilot, or when the airplane leaves the cradle 2 and takes to the air. It is to be noted that in the position of the parts shown in Figure 1, the cradle 2 is resting on a forward support 62. In this position of the parts the airplane is in the no-lift attitude which permits the airplane and the car to pick up speed more readily than in any other position. When flying speed is obtained, the pilot through the controls rotates the airplane on the cradle 2 so that the cradle 2 rests on the rear support 63 and the airplane takes off. Provision is made when an airplane takes off, as will now be described, for the application of the brakes on the car. Likewise if the airplane does not take off and the pilot desires to stop the car and airplane, this can be effected.

The control mechanism comprises a Bowden wire 100 which is attached to a fixture 101 which is bolted to, or integrally formed with, a connection 102 which rests on top and is keyed to, or integrally formed with, the valve disk 52. The mechanism just described is adapted to rotate in suitable fittings which we have indicated generally at 103. There is a sheathing provided, as indicated at 104, for the Bowden wire.

The top end of the Bowden wire is attached to a shank 105 which carries a pull out member 106. The shank and pull out member are held in place on the Bowden wire by suitable fittings, generally indicated at 107. The pull out member 106 has a key 108 which fits in a keyway 109 formed in a guide member 110.

The guide member 110 is adapted to slide in a cylinder 111 and carries at its upper end a helically toothed pinion 112. The cylinder 111 is provided with a shoulder 113 which is adapted to lie flush with the lower surface 114 of the body unit or other part of the airplane 1. In order to form a frictionless fit between the cylinder 111 and the guide member 110, we have provided for lubricating oil waste 115, which is held in place by means of a screw cap 116 mounted on the cylinder 111.

The pull out member 106 is held in place in the guide member 110 by means of a ball 117 which is pressed into an aperture 118 formed in the pull out member 106. The ball is held pressed into the aperture 118 by means of a compression spring 119 carried in an aperture 120 formed in the guide member 110. The tension of the spring 119 is sufficient to enable a pull on the Bowden wire connection 100 to exert a considerable downward pull on the guide member 110. The spring pressure is regulated to enable this pull to effect the functions which will be later described.

The cylinder 111 is provided with a laterally extending fitting 121 having an aperture 122 which carries a compression spring 123 which abuts at one end against a helically toothed rack 124 which meshes with the helical teeth on the pinion 112.

The rack 124 carries an extension 125 over which the spring 123 fits. The extension 125 is reduced in diameter at its end 126, as illustrated in Figure 4, and this reduced end is attached to another Bowden wire 127 adapted to slide in a sheathing 128 which is mounted on a suitable fixture indicated generally by the numeral 129 at the end of the laterally extending fitting 121. The helical pinion 112 is provided with an upwardly extending stem 130 to which is secured a cap 131. To tension the helical pinion 112 in the up position, we have provided a compression spring 132 which bears at one end against the cap 131 and at the other end against the top 133 of the control fitting.

The spring 132 is not as strong as spring 123, for a purpose which will now be described.

If the pilot wishes to apply the brakes on the car he pulls the Bowden wire 127 in the direction of the arrows shown in Figure 4. This causes the rack 124 to rotate the helically extending pinion 112 which turns the guide member 110 and rotates the pull out member 106. This causes the Bowden wire 100 to rotate to rotate the valve disk 52 to cause it to assume a position to admit compressed air to the brake cylinders. Upon release of tension on the Bowden wire 127 the spring 123 will push the rack back again into the position shown in Figure 4, which causes the valve parts to assume the position shown in Figure 7 and allows the air to exhaust from the brake cylinders 26.

Let us assume that the seaplane 1 is taking off from the cradle and that tension is exerted on the Bowden wire 100. This pulls on pull out member 106 which, because of the position of the ball 117 in the aperture 118, causes the pull out member 106 to pull down strongly on the guide member 110, and the guide member is pulled downwardly carrying with it helical gear 112. By reason of the fact that the helical gear 112 is in mesh with the helical gears of the rack 124, the gear 112 will be rotated, since the spring 123 is strong and tends to hold the rack in the position shown in Figure 4. This rotation of the gear 112 is transmitted through guide member 110, through pull out member 106 to Bowden wire 100, and thence to the valve disk 52. The valve disk is rotated into a position to admit air to the brake cylinders. Thus the car 5 is arrested. The pull out member 106 is pulled out from its position in the guide member 110 very shortly after the valve disk 52 has been rotated and thus there is nothing to rotate the valve disk 52 back into the off position, since there is no longer contact between the pull out member 106 and the guide member 110.

From the above it is apparent that the pilot can apply the brakes at will to the vehicle upon which the plane is being transported for launching. Moreover an automatic means for applying the brakes upon the airplane leaving the vehicle has been provided.

This mechanism just described introduces an added safeguard in the take-off of an airplane from a launching vehicle since if sufficient speed has not been acquired, or something in the way of other emergency occurs, the pilot can apply the brakes on the vehicle and not take off. Moreover, the vehicle will be stopped by the braking system on the vehicle after the airplane has left the cradle. In both instances the operation of the brakes on the vehicle is supplemented by the additional safety factor furnished by the action of the arresting gear cable.

The center of gravity of the airplane is about one quarter chord distance from the leading edge of the wing in most cases. In the present drawings the airplane is shown a little to the rear of the preferred position in the cradle. It is desirable that the center of gravity of the airplane in the cradle be a little forward of the cradle pivot so that the airplane will easily remain in the position indicated in Figure 1, with the cradle contacting the forward support.

While we have shown and described the preferred form of our invention, we wish it to be understood that we do not confine ourselves to the precise details of construction herein set forth by way of illustration, as it is apparent that many changes and variations may be made therein, by those skilled in the art without departing from the spirit of the invention, or exceeding the scope of the appended claims.

We claim:

1. A launching system for an airplane comprising a movable vehicle on which the airplane is adapted to be mounted for launching, a source of compressed fluid on the vehicle, air-type brakes carried by the vehicle and connected with said source, rotatable valve means carried by the vehicle for controlling the flow of compressed fluid from said source to the brakes, a rotation producing means carried on the airplane, a flexible connective means for transmitting pulling and twisting forces between said rotation means and the rotatable valve, said flexible means being connected between said rotation means and the rotatable valve so as to pull away from such connection under a predetermined strain, said rotation means being rotated by the pull of said flexible means of less degree than that adapted to cause said pulling-away, control means operable by the pilot of the airplane for causing rotation of the rotation means, whereby the air brakes on the vehicle may be operated optionally by the pilot from the airplane and automatically upon separation of the airplane from the vehicle.

2. A launching system for an airplane comprising a movable vehicle on which the airplane is adapted to be mounted for launching, a source of compressed fluid on the vehicle, air-type brakes carried by the vehicle and connected with said source, valve means carried by the vehicle for controlling the flow of compressed fluid from said source to the brakes, motion producing means carried by the airplane adapted to be moved relative to the airplane during the beginning of separation of the airplane from the vehicle, means for transmitting motion from said motion producing means to the valve means, said transmitting means being connected between the motion producing means and the valve means so as to pull away from such connection after a separation of the airplane and vehicle beyond that separation necessary for said motion producing means to operate the valve means, control means operable by the pilot of the airplane for independently causing said relative movement of the motion producing means, rotation of the rotation means, whereby the air-type brakes on the vehicle may be operated optionally by the pilot from the airplane and automatically upon separation of the airplane from the vehicle.

REUBEN H. FLEET.
WILLIAM B. WHEATLEY.
ISAAC M. LADDON.